US012559108B2

(12) United States Patent
Weslati et al.

(10) Patent No.: US 12,559,108 B2
(45) Date of Patent: Feb. 24, 2026

(54) TECHNIQUES FOR OPTIMIZING VEHICLE FUNCTION EXECUTION BASED ON VEHICLE OPERATING MODES

(71) Applicant: FCA US LLC, Auburn Hills, MI (US)

(72) Inventors: Feisel Weslati, Troy, MI (US); Rudolf Kharpuri, Auburn Hills, MI (US); Omkar Bedarkar, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 191 days.

(21) Appl. No.: 18/488,199

(22) Filed: Oct. 17, 2023

(65) Prior Publication Data

US 2025/0121827 A1     Apr. 17, 2025

(51) Int. Cl.
 *B60W 30/182*      (2020.01)
 *B60W 20/10*       (2016.01)

(52) U.S. Cl.
 CPC .......... *B60W 30/182* (2013.01); *B60W 20/10* (2013.01); *B60W 2710/10* (2013.01); *B60W 2720/10* (2013.01)

(58) Field of Classification Search
 USPC ......................................................... 718/104
 See application file for complete search history.

(56) References Cited

U.S. PATENT DOCUMENTS 7,522,983 B2    4/2009  Hashimoto et al.
8,428,843 B2    4/2013  Lee et al.

8,705,527 B1    4/2014  Addepalli et al.
10,625,776 B2   4/2020  Rebhan et al.
10,906,398 B2   2/2021  Ricci
11,608,075 B2   3/2023  Suzuki et al.
11,634,149 B2   4/2023  Yousuf et al.
2009/0018715 A1*  1/2009  Kanayama ............. B60K 6/445
                                       477/4
2012/0133204 A1*  5/2012  Ang ......................... H02J 7/04
                                       307/10.1
2022/0297710 A1*  9/2022  Larsson ................ B60W 40/10

FOREIGN PATENT DOCUMENTS

WO      WO-2024084495 A1 *  4/2024   ............. H05B 45/20

* cited by examiner

*Primary Examiner* — Madison R. Inserra
(74) *Attorney, Agent, or Firm* — Jeremy J. Klobucar

(57)          ABSTRACT

A vehicle mode triggered control system for a vehicle includes a hybrid control processor (HCP) configured to detect a current operating mode of the vehicle, determine a set of inactive sub-systems of a set of sub-systems of the vehicle that are not configured to operate during the current operating mode of the vehicle, wherein each of the set of sub-systems is configured to for limited mode-based operation and not during a full operating period of the vehicle, and execute application software including a plurality of application functions by executing a first set of application functions of the plurality of application functions at a first rate and executing a second set of application functions of the plurality of application functions at a slower second rate, wherein the second set of application functions are limited to one or more of the set of inactive sub-systems.

18 Claims, 2 Drawing Sheets

TECHNIQUES FOR OPTIMIZING VEHICLE FUNCTION EXECUTION BASED ON VEHICLE OPERATING MODES

FIELD

The present application generally relates to vehicle control systems and, more particularly, to techniques for optimizing the execution of vehicle functions based on vehicle operating modes.

BACKGROUND

Today's vehicles are becoming more and more complex and often include a plurality of different controllers or electronic control units (ECUs). This is particularly true for electrified or hybrid electric vehicles (HEVs), wherein a plurality of different controllers or ECUs are coordinated to operate under a primary or supervisory hybrid control processor (HCP). As the vehicle becomes more complex, the application software executing on the HCP also becomes more complex, which leads to HCP overload. One conventional solution to this problem is to implement higher performance processors (e.g., multi-core, graphical processing units, or GPUs), but this substantially increases vehicle costs. Another conventional solution to this problem is decreasing the frequency of (or increasing the time intervals between) the application functions, but this could potentially lead to drivability issues as many application functions are time-critical. Accordingly, while these conventional solutions do work well for their intended purpose, there exists an opportunity for improvement in the relevant art.

SUMMARY

According to one example aspect of the invention, a vehicle mode triggered control system for a vehicle is presented. In one exemplary implementation, the vehicle mode triggered control system comprises a set of sub-systems of the vehicle, each vehicle sub-system being configured to operate only during one or more specific operating modes of vehicle and not during a full operating period of the vehicle and a hybrid control processor (HCP) configured to detect a current operating mode of the vehicle, determine a set of inactive sub-systems of the set of sub-systems that are not configured to operate during the current operating mode of the vehicle, and execute application software including a plurality of application functions by executing a first set of application functions of the plurality of application functions at a first rate, wherein the first set of application functions are not limited to any of the set of inactive sub-systems, and executing a second set of application functions of the plurality of application functions at a second rate that is slower than the first rate, wherein the second set of application functions are limited to one or more of the set of inactive sub-systems.

In some implementations, the second rate is zero such that the second set of application functions are not executed until the respective one or more of the set of inactive sub-systems are activated. In some implementations, the operating mode of the vehicle is one of a secured park mode, a charging mode, and a drive-ready (DR) mode. In some implementations, one of the set of sub-systems is an immobilizer system for a driveline of the vehicle. In some implementations, the immobilizer system is activated when the vehicle is in the secured park mode or charging mode and is deactivated when the vehicle is in the DR mode. In some implementations, one of the set of sub-systems is a charging system for a battery system of the vehicle. In some implementations, the charging system is activated when the vehicle is in the charging mode and is deactivated when the vehicle is in the secured park mode or the DR mode. In some implementations, the operating mode of the vehicle is one of a low speed driving mode and a high speed driving mode, and wherein one of the set of sub-systems is a strategic gear optimization system for a transmission of the vehicle. In some implementations, the strategic gear optimization system is limited to a set of high speed gears of the transmission when the vehicle is in the high speed driving mode.

According to another aspect of the invention, a vehicle mode triggered control method for a vehicle is presented. In one exemplary implementation, the method comprises detecting, by an HCP of the vehicle, a current operating mode of the vehicle, wherein the vehicle includes a set of sub-systems that are each configured to operate only during one or more specific operating modes of vehicle and not during a full operating period of the vehicle, determining, by the HCP, a set of inactive sub-systems of the set of sub-systems that are not configured to operate during the current operating mode of the vehicle, and executing, by the HCP, application software including a plurality of application functions by executing a first set of application functions of the plurality of application functions at a first rate, wherein the first set of application functions are not limited to any of the set of inactive sub-systems, and executing a second set of application functions of the plurality of application functions at a second rate that is slower than the first rate, wherein the second set of application functions are limited to one or more of the set of inactive sub-systems.

In some implementations, the second rate is zero such that the second set of application functions are not executed until the respective one or more of the set of inactive sub-systems are activated. In some implementations, the operating mode of the vehicle is one of a secured park mode, a charging mode, and a DR mode. In some implementations, one of the set of sub-systems is an immobilizer system for a driveline of the vehicle. In some implementations, the immobilizer system is activated when the vehicle is in the secured park mode or charging mode and is deactivated when the vehicle is in the DR mode In some implementations, one of the set of sub-systems is a charging system for a battery system of the vehicle. In some implementations, the charging system is activated when the vehicle is in the charging mode and is deactivated when the vehicle is in the secured park mode or the DR mode. In some implementations, the operating mode of the vehicle is one of a low speed driving mode and a high speed driving mode, and wherein one of the set of sub-systems is a strategic gear optimization system for a transmission of the vehicle. In some implementations, the strategic gear optimization system is limited to a set of high speed gears of the transmission when the vehicle is in the high speed driving mode.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, as today's vehicle become more complex, application software executing on a primary or supervisory hybrid control processor (HCP) also becomes more complex, which leads to HCP overload. One conventional solution to this problem is to implement higher performance processors (e.g., multi-core, graphical processing units, or GPUs), but this substantially increases vehicle costs. Another conventional solution to this problem is decreasing the frequency of (or increasing the time intervals between) the application functions, but this could potentially lead to drivability issues as many application functions are time-critical. Accordingly, improved vehicle mode triggered control systems and methods are presented herein. These techniques leverage the current vehicle operating mode to trigger certain software application functions at a slower rate (or not at all) during periods when the respective sub-systems are not operational. Some primary non-limiting examples of these sub-vehicle systems are an immobilizer system, a charging system, and a strategic gear optimization system.

The immobilizer system, for example, only securely immobilizes the vehicle during specific vehicle modes, such as a secure park mode and a charging mode. Similar to the immobilizer system, the charging system only operates during the charging mode (which could also have the immobilizer system active and engaged). Neither of these systems, however, operate and thus do not need to be routinely accounted for during normal (drive-ready) operation of the vehicle. The other example—the strategic gear optimization system-could be limited to a subset of all available gears of the transmission or transmission system based on a low speed versus high speed operating mode of the vehicle. In other words, low gears or gear ratios do not need to be accounted for in gear optimization during high speed (e.g., highway) driving. Potential benefits of these techniques include decreased costs/complexity and improved drivability compared to the above-described conventional solutions.

Figure 1:
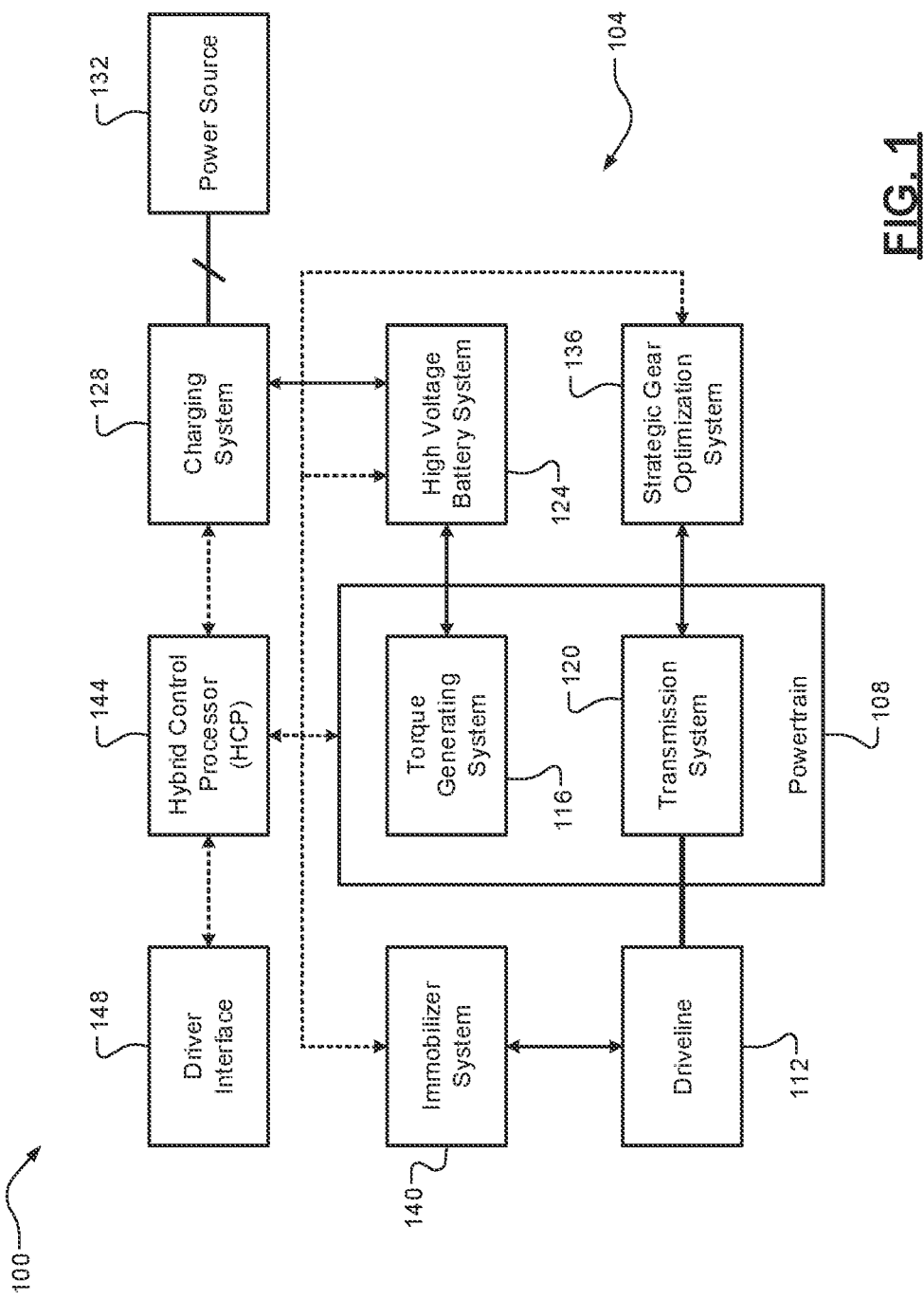
FIG. 1 is a functional block diagram of a vehicle having an example control system configured for vehicle mode triggering of software application functions according to the principles of the present application.

Referring now to FIG. 1, a functional block diagram of a vehicle 100 having a vehicle mode triggered control system 104 according to the principles of the present application is illustrated. The vehicle 100 includes a powertrain 108 configured to generate and transfer torque to a driveline 112 for vehicle propulsion. The powertrain 108 includes a torque generating system 116 configured to generate drive torque and a transmission system 120 configured to transfer the drive torque to the driveline 112. It will be appreciated that the vehicle 100 could have any suitable configuration, such as an electric or battery electric vehicle (BEV), a hybrid electric vehicle (HEV) such as a plug-in HEV (PHEV) or a range-extended electric vehicle (REEV), and the like. As previously mentioned, electrified or hybrid vehicles typically have more complex control systems having a primary or supervisory HCP and thus the techniques of the present application are particularly beneficial for these types of vehicles. It will be appreciated, however, that the techniques of the present application could also be applicable to conventional internal combustion engine (ICE) only vehicles. Thus, the torque generating system 116 includes one or more electric motors, an ICE, or some combination thereof.

In some implementations, the torque generating system 116 includes or utilizes a high voltage battery system 124, such as for powering its electric motor(s). The high voltage battery system 124 is rechargeable via recaptured vehicle kinetic energy and/or by a charging system 128, which is configured to receive external wall/outlet power (e.g., from a charging source or station 132) to recharge the high voltage battery system 124 when the vehicle 100 is in a charging mode. The transmission system 120 includes a multi-speed or multi-gear automatic transmission other suitable components such as a fluid coupling or torque converter.

A strategic gear optimization system 136 is configured to control or coordinate with the transmission system 120 such that the transmission system 120 engages a desired gear or gear ratio for a particular strategic reason (e.g., optimal fuel economy). An immobilizer system 140 is configured to securely immobilize the driveline 112 of the vehicle 100 and includes a park pawl system, an electronic park brake, and any other suitable components. An HCP 144 controls operation of the vehicle 100, including the above-described subsystems 128, 136, and 140. The HCP 144, for example, could control the powertrain 108 to generate an amount of drive torque to satisfy a driver torque request via a driver interface 148.

Figure 2:
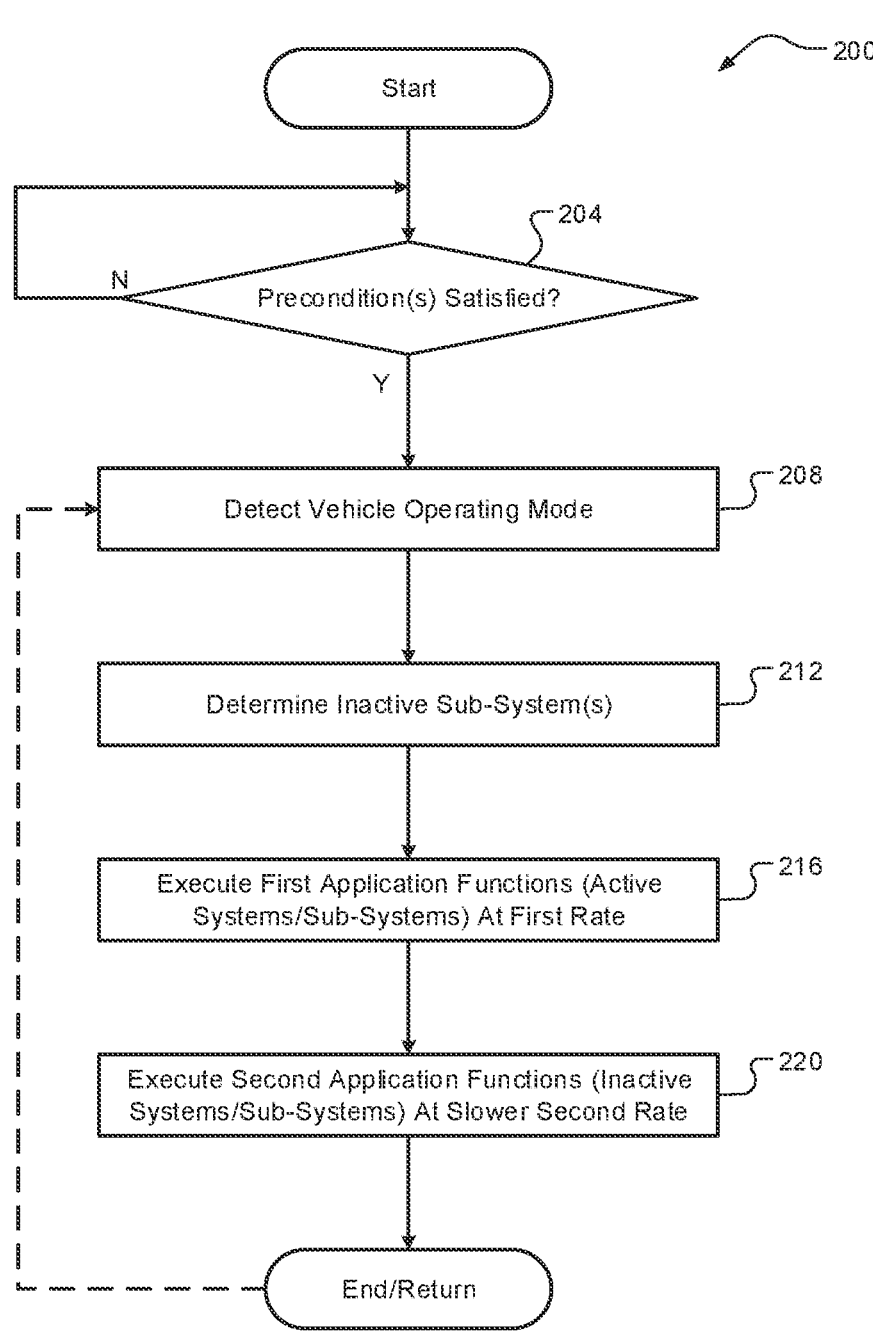
FIG. 2 is a flow diagram of an example vehicle control method with vehicle mode triggering of software application functions according to the principles of the present application.

Referring now to FIG. 2, a flow diagram of an example vehicle mode triggered control method 200 for a vehicle according to the principles of the present application is illustrated. While the method 200 specifically references the vehicle 100 and its components for illustrative/descriptive purposes, it will be appreciated that the method 200 could be applicable to any suitable configured vehicle. At 204, the HCP 144 determines whether a set of one or more preconditions are satisfied. This step 204, while optional, could determine whether there are any existing malfunctions or faults that would otherwise inhibit operation of the vehicle 100 and the method 200. When false, the method 200 could end or return to 204. Otherwise, the method 200 continues to 208. At 208, the HCP 144 determines a current operating mode of the vehicle 100. The operating mode could be, for example, a secure park mode, a charging mode, or a drive-ready (DR) operating mode. The DR operating mode could be further divided into a low speed operating mode and high speed operating mode, which could have respective vehicle speed thresholds associated therewith. At 212, the HCP 144 determines which of the sub-systems—the charging system 128, the strategic gear optimization system 136, and the immobilizer system 140—are active/inactive for the current operating mode of the vehicle 100.

For example, as previously described, the immobilizer system 140 and the charging system 128 could be active during the charging mode and the strategic gear optimization system 136 would be inactive. Similarly, for example, the strategic gear optimization system 136 could be active during the DR mode and the charging system 128 and the immobilizer system 140 could be inactive, and the strategic gear optimization system 136 could be limited in its operation to a subset of gears or gear ratios of the transmission system 120 depending on whether the vehicle 100 is operating in the low speed or high speed driving mode. At 216 and 220, the HCP 144 controls the active system/sub-system application functions at a first rate (e.g., a normal or default rate) and controls the inactive systems/sub-system application functions at a slower second rate, which could be zero (i.e., disabled application function(s) until the respective sub-system(s) are activated). The method 200 then ends or could return for further processing loops. For example, the method 200 could return to 208 and could continue by determining the current operating mode of the vehicle 100 again. If the operating mode of the vehicle 100 has changed since the previous cycle, the rate at which the application function(s) are executed could change depending on whether their respective systems/sub-systems are active or inactive.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle mode triggered control system for a vehicle, the vehicle mode triggered control system comprising:
    a set of sub-systems of the vehicle, each vehicle sub-system being configured to operate only during one or more specific operating modes of the vehicle and not during a full operating period of the vehicle; and
    a hybrid control processor (HCP) configured to:
        detect a current operating mode of the vehicle;
        determine a set of inactive sub-systems of the set of sub-systems that are not configured to operate during the current operating mode of the vehicle; and
        execute application software including a plurality of application functions by:
            executing a first set of application functions of the plurality of application functions at a first rate, wherein the first set of application functions are not limited to any of the set of inactive sub-systems; and
            executing a second set of application functions of the plurality of application functions at a second rate that is slower than the first rate and that is greater than zero, wherein the second set of application functions are limited to one or more of the set of inactive sub-systems.

2. The vehicle mode triggered control system of claim 1, wherein the operating mode of the vehicle is one of a secured park mode, a charging mode, and a drive-ready (DR) mode.

3. The vehicle mode triggered control system of claim 2, wherein one of the set of sub-systems is an immobilizer system for a driveline of the vehicle.

4. The vehicle mode triggered control system of claim 3, wherein the immobilizer system is activated when the vehicle is in the secured park mode or charging mode and is deactivated when the vehicle is in the DR mode.

5. The vehicle mode triggered control system of claim 4, wherein one of the set of sub-systems is a charging system for a battery system of the vehicle.

6. The vehicle mode triggered control system of claim 5, wherein the charging system is activated when the vehicle is in the charging mode and is deactivated when the vehicle is in the secured park mode or the DR mode.

7. The vehicle mode triggered control system of claim 1, wherein the operating mode of the vehicle is one of a low speed driving mode and a high speed driving mode, and wherein one of the set of sub-systems is a strategic gear optimization system for a transmission of the vehicle.

8. The vehicle mode triggered control system of claim 7, wherein the strategic gear optimization system is limited to a set of high speed gears of the transmission when the vehicle is in the high speed driving mode.

9. The vehicle mode triggered control system of claim 1, wherein HCP is configured to execute the second set of application functions at the second rate such that at least some of the second set of application functions are executed while the one or more of the set of inactive sub-systems are inactive.

10. A vehicle mode triggered control method for a vehicle, the method comprising:
    detecting, by a hybrid control processor (HCP) of the vehicle, a current operating mode of the vehicle, wherein the vehicle includes a set of sub-systems that are each configured to operate only during one or more specific operating modes of the vehicle and not during a full operating period of the vehicle;
    determining, by the HCP, a set of inactive sub-systems of the set of sub-systems that are not configured to operate during the current operating mode of the vehicle; and
    executing, by the HCP, application software including a plurality of application functions by:
        executing a first set of application functions of the plurality of application functions at a first rate, wherein the first set of application functions are not limited to any of the set of inactive sub-systems; and
        executing a second set of application functions of the plurality of application functions at a second rate that is slower than the first rate, wherein the second set of application functions are limited to one or more of the set of inactive sub-systems.

11. The vehicle mode triggered control method of claim 10, wherein the operating mode of the vehicle is one of a secured park mode, a charging mode, and a drive-ready (DR) mode.

12. The vehicle mode triggered control method of claim 11, wherein one of the set of sub-systems is an immobilizer system for a driveline of the vehicle.

13. The vehicle mode triggered control method of claim 12, wherein the immobilizer system is activated when the vehicle is in the secured park mode or charging mode and is deactivated when the vehicle is in the DR mode.

14. The vehicle mode triggered control method of claim 13, wherein one of the set of sub-systems is a charging system for a battery system of the vehicle.

15. The vehicle mode triggered control method of claim 14, wherein the charging system is activated when the vehicle is in the charging mode and is deactivated when the vehicle is in the secured park mode or the DR mode.

16. The vehicle mode triggered control method of claim 10, wherein the operating mode of the vehicle is one of a low speed driving mode and a high speed driving mode, and wherein one of the set of sub-systems is a strategic gear optimization system for a transmission of the vehicle.

17. The vehicle mode triggered control method of claim 16, wherein the strategic gear optimization system is limited to a set of high speed gears of the transmission when the vehicle is in the high speed driving mode.

18. The vehicle mode triggered control method of claim 10, wherein the executing the second set of application functions at the second rate is performed such that at least some of the second set of application functions are executed while the one or more of the set of inactive sub-systems are inactive.

\* \* \* \* \*